(12) United States Patent
Gordon et al.

(10) Patent No.: US 10,013,458 B2
(45) Date of Patent: Jul. 3, 2018

(54) DETECTING LOGICAL RELATIONSHIPS BASED ON STRUCTURED QUERY STATEMENTS

(71) Applicant: INTERNATIONAL BUSINESS MACHINES CORPORATION, Armonk, NY (US)

(72) Inventors: Itai Gordon, Jerusalem (IL); Peter Hagelund, Princeton, NJ (US); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/654,969

(22) Filed: Jul. 20, 2017

(65) Prior Publication Data
US 2017/0316057 A1    Nov. 2, 2017

Related U.S. Application Data

(63) Continuation of application No. 15/055,672, filed on Feb. 29, 2016.

(51) Int. Cl.
*G06F 17/30* (2006.01)

(52) U.S. Cl.
CPC .. *G06F 17/30477* (2013.01); *G06F 17/30294* (2013.01); *G06F 17/30958* (2013.01)

(58) Field of Classification Search
None
See application file for complete search history.

(56) References Cited

U.S. PATENT DOCUMENTS

| | | |
|---|---|---|
| 7,058,631 B1 * | 6/2006 | Pal .................... G06F 17/30569 |
| 7,062,496 B2 | 6/2006 | Dettinger et al. |
| 7,716,167 B2 | 5/2010 | Colossi et al. |
| 8,019,771 B2 | 9/2011 | Iwao |
| 8,135,698 B2 | 3/2012 | Dettinger et al. |
| 8,676,859 B2 | 3/2014 | Sayal et al. |
| 2012/0159433 A1 | 6/2012 | Ahadian et al. |

OTHER PUBLICATIONS

Mell et al., "The NIST Definition of Cloud Computing," National Institute of Standards and Technology, Sep. 2011, p. 1-3, Special Publication 800-145.
Gordon et al., U.S. Appl. No. 15/055,672, filed Feb. 29, 2016, titled "Detecting Logical Relationships Based on Structured Query Statements," pp. 1-35.
IBM: List of IBM Patents or Patent Applications Treated As Related (Appendix P), Jul. 20, 2017, pp. 1-2.

* cited by examiner

*Primary Examiner* — Belix M Ortiz Ditren
(74) *Attorney, Agent, or Firm* — Reza Sarbakhsh

(57) ABSTRACT

An example computer-implemented method includes receiving, via a processor, a plurality of structured query statements associated with an application and a database. The method includes detecting, via the processor, a logical relationship between at least two of the plurality of structured query statements based on a common source, a predetermined threshold time, a common transaction. The method includes generating, via the processor, a model based on the detected logical relationship. The method further includes receiving, via the processor, a request to modify the database. The method also further includes modifying, via the processor, the database in response to detecting that a predetermined threshold probability of application functionality impairment is not exceeded.

1 Claim, 6 Drawing Sheets

DETECTING LOGICAL RELATIONSHIPS BASED ON STRUCTURED QUERY STATEMENTS

BACKGROUND

The present techniques relate to detecting logical relationships in databases. More specifically, the techniques relate to detecting logical relationships in databases based on structured query statements.

SUMMARY

According to an embodiment described herein, a system can include processor to receive a plurality of structured query statements associated with an application and a database. The processor can also further detect a logical relationship between at least two of the plurality of structured query statements based on a common source, a predetermined threshold time, a common transaction. The processor can also generate a model based on the detected logical relationship. The processor can further receive a request to modify the database. The processor can also further modify the database in response to detecting that a predetermined threshold probability of application functionality impairment is not exceeded.

According to another embodiment described herein, a computer-implemented method can include receiving, via a processor, a plurality of structured query statements associated with an application and a database. The method can further include detecting, via the processor, a logical relationship between at least two of the plurality of structured query statements based on a common source, a predetermined threshold time, a common transaction. The method can also further include generating, via the processor, a model based on the detected logical relationship. The method can also include receiving, via the processor, a request to modify the database. The method can also further include modifying, via the processor, the database in response to detecting that a predetermined threshold probability of application functionality impairment is not exceeded.

According to another embodiment described herein, a computer program product for detecting logical relationships between structured query statements. The computer readable storage medium is not a transitory signal per se. The program code executable by a processor to cause the processor to receive a plurality of structured query statements associated with an application and a database. The program code can also cause the processor to detect a logical relationship between at least two of the plurality of structured query statements based on a common source of the at least two structured query statements, a predetermined threshold time between the at least two structured query statements, a common transaction associated with the at least two structured query statements. The program code can also cause the processor to generate a model based on the detected logical relationship. The program code can also cause the processor to receive a request to modify the database. The program code can also cause the processor to modify the database in response to detecting that a predetermined threshold probability of application functionality impairment is not exceeded.

DETAILED DESCRIPTION

Figure 1:
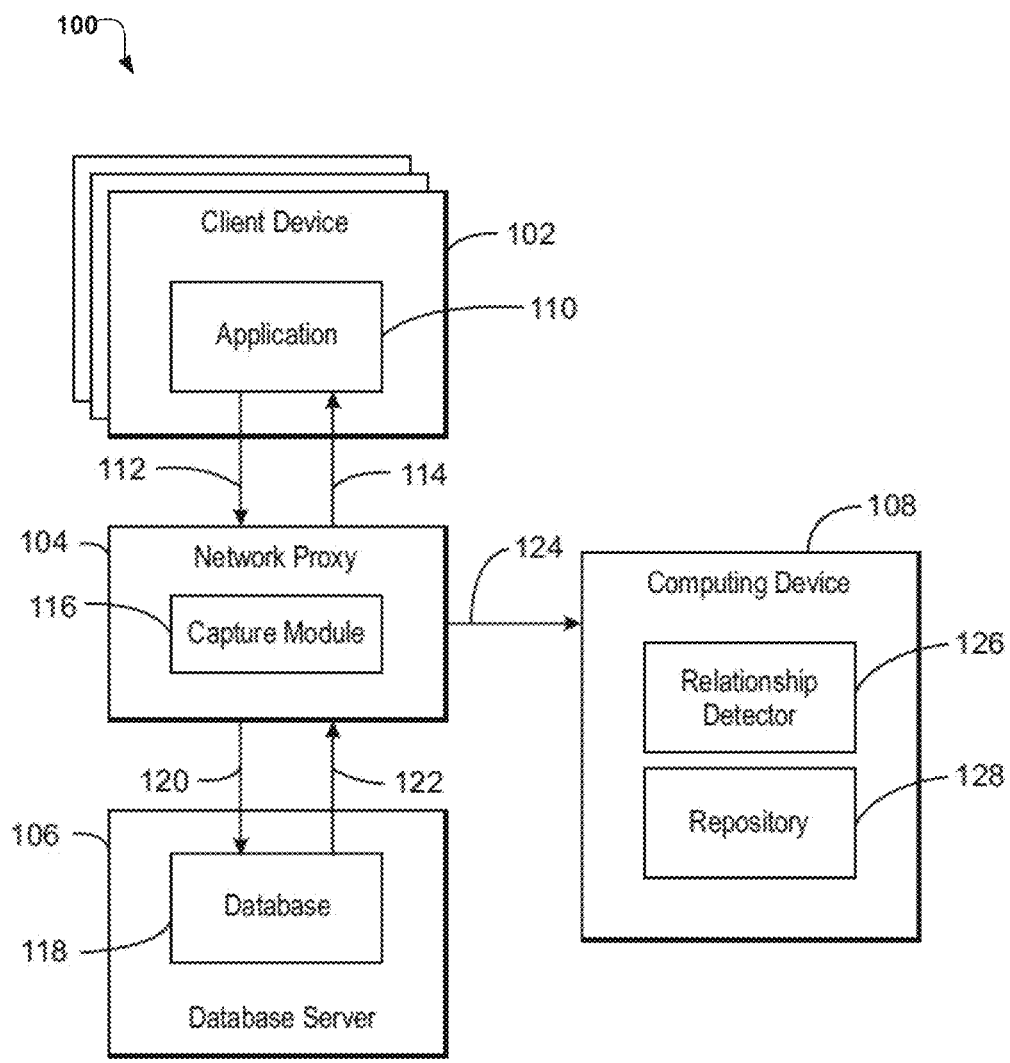
FIG. 1 is an example system for detecting logical relationships based on structured query statements.

Sometimes schema information for databases cannot be known in advance when developing software products that are to operate on a customer's databases. Although relational database management systems may support declarative referential integrity through the definition of primary keys, foreign keys and indexes, many databases are designed without such constraints. For example, a database may not be designed with these constraints for performance and flexibility reasons. This can prevent a product from querying database metadata and obtaining the relationships from the database metadata.

When one or more applications access a relational database, the corresponding queries, updates and deletions may contain predicates and join operations, among others. In some examples, the predicates and join operations may imply logical relationships between the various tables of the database. As used herein, logical relationships refer to implied relationships that are effectively built into the application(s) that access a database. By contrast, as used herein, physical relationships refer to relationships described by the referential integrity designed into a database through the use of foreign keys.

According to embodiments of the present disclosure, a computing system can detect logical relationships based on structured query statements and generate data flow graphs based on the logical relationships. For example, the system can receive a plurality of structured query statements associated with an application and a database. For example, the structured query statements can be Structured Query Language (SQL) statements. The system can detect logical relationships among the plurality of structured query statements based on a source, a time, and/or transaction. For example, the source can be indicated by an IP address and the time can be indicated by a time stamp. The system can then generate a data flow graph based on the detected logical relationship. In some examples, the system can generate a report based on the detected logical relationships. For example, the report can include a trust level or trust score. Thus, the present techniques enable computer products to be developed that do not violate the implied constraints of the logical relationships. For example, products can include extract, transform and load (ETL) products; data masking and redaction products; and archiving products; among other products that use knowledge of inter-table relationships and columns to be used for sorting results and deleting data without the need for the customer to enter this information manually. Furthermore, the present techniques enable a database administrator to see the implications of changing a database structure. For example, a database administrator may want to change a database structure and thus may want to know the implications of changing the structure, such as what applications might be affected by that change by assuming logical relations between fields that might not be correct after the change. The present techniques can display detected logical relationships so that the DB administrator can take the logical relationships into account when making any changes in database structure. Furthermore, the present techniques enable applications that generate reports to include a trust level so that a data analyzer can estimate how much to trust the reports based on where the data was taken from and based on what relations in the database the report is assuming.

In some scenarios, the techniques described herein may be implemented in a cloud computing environment. As discussed in more detail below in reference to at least FIGS. 3-5, a computing device configured to detect logical relationships based on structured query statements may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example system is shown that can detect logical relationships based on structured query statements. The example system is generally referred to by the reference number 100 and can be implemented using the example computing device 500 of FIG. 5 below.

The example system 100 of FIG. 1 includes one or more client devices 102, a network proxy 104, a database server 106, and a computing device 108. The at least one client device 102 includes an application 110 that is communicatively coupled in two directions to the network proxy 104 as indicated via arrows 112 and 114. The network proxy 104 includes a capture module 116 and is communicatively coupled to a database 118 of a database server 106 as indicated by arrows 120 and 122. The network proxy 104 is further communicatively coupled to the computing device 108 as indicated by an arrow 124. The computing device 108 includes a relationship detector 126 and a repository 128.

As shown in FIG. 1, the application 110 of the at least one client device 102 may send structured query statements to the database 118 of the database server 106 via the network proxy 104. For example, the application 110 may issue SQL statements against the database 118. In some examples, the application 110 can access the database 118 through a TCP/IP (or similar) network interface, resulting in a tiered IT architecture with the database server 106 running on one tier and the application 110 accessing the database 118 on a different tier. In some examples, the capture module 116 of the network proxy 104 can capture structured query statements using a proxy process. For example, the capture module 116 can be part of a software appliance. The software appliance may utilize the network proxy 104 that sits between the application 110 and the database server and effectively copy the network packets being sent back and forth as indicated by arrows 112, 114, 120, and 122. In some examples, the capture module 116 can send the captured structured query statements to the computing device 108. In some examples, the captured structured query statements may be stored in the repository 128 for subsequent use and/or analysis. In some examples, structured query statements can be obtained by the computing device 108 by extracting SQL statements from the source code of the application 110 that accesses the database 118. For example, if the source code is available, then the source code can be received by the relationship detector 126 for analysis. In some examples, the structured query statements can be alternatively obtained by extracting the SQL statements from pre-bound packages stored within the database 118. For example, the pre-bound package may be stored within a metadata repository of the database 118. Packages, as used herein, refer to control-structure database objects that contain executable forms of structured query statements or placement holders for executable forms. Pre-bound packages, as used herein, refer to structured query statements before the query statements are processed in order to execute them on a database server product. In some examples, the structured query statements may be obtained by capturing SQL statements from a bespoke database driver. As used herein, a bespoke database driver is a module that acts like a "wrapper" around the real driver. For example, the bespoke database driver can be an application programming interface (API) for accessing databases such as Open Database Connectivity (ODBC), Java Database Connectivity (JDBC), or a proprietary driver on the computing device 102 including the application 110.

The relationship detector 126 can analyze the captured structured query statements and detect one or more logical relationships. In some examples, the logical relationships can be detected in real time. For example, the capture module 116 can send captured structured query statements directly to the relationship detector 126 for real time analysis. In some examples, the logical relationships can be detected after a predetermined amount of time. For example, after the predetermined amount of elapsed time, a plurality of structured query statements issued by one or more applications 110 against the database 118 may have been captured by the capture module 116 and stored in the repository 128. The relationship detector 126 can analyze the plurality of structured query statements to detect one or more logical relationships.

The relationship detector 126 can also generate a model based on the detected logical relationships. For example, the relationship detector 126 can create a logical data model based on the detected logical relationships. In some examples, the model can include a data flow graph.

For example, database designers typically try to normalize data structures to a point where the amount of duplicated information is reduced as much as possible or practical. Such database design may result in a database 118 containing a large number of tables, many of which are maintained with parent/child relationships. For example, the tables may correspond to customers, orders, and order items. A customer may have placed many orders and each of those orders may contain many order items. To query the orders for an on-line customer, a structured query statement such as a SQL SELECT statement may contain a join such similar to the statement:

SELECT * FROM CUSTOMER C, ORDER O
    WHERE               C.CUST_NO=?               AND
    C.CUST_NO=O.CUST_NO

The '?' can be a placeholder for an actual customer number and can be supplied by the application 110 as a variable data value accompanying the SQL statement. By analyzing SQL statements like the above statement, a relationship detector 126 can infer that the ORDER table is a child of the CUSTOMER table and that the logical foreign key is CUST_NO. Similarly, to find all order items for an order, the application 110 may issue an SQL statement similar to:

SELECT * FROM ORDER O, ITEM I
    WHERE               O.ORDER_NO=?            AND
    O.ORDER_NO=I.ORDER_NO

This SQL statement can allow the relationship detector 126 to infer that the ITEM table is a child of the ORDER table and that the logical foreign key is ORDER_NO.

In a second, more complex example, an application 110 may query all orders and items for a customer using an SQL statement similar to:

SELECT * FROM CUSTOMER C, ORDER O, ITEM I
    WHERE               C.CUST_NO=?               AND
    O.CUST_NO=C.CUST_NO
    AND O.ORDER_NO=I.ORDER_NO

While slightly more complex, analysis of such a statement can lead to the same result as the analysis of the individual statements. For example, the relationship detector 126 may infer that the ORDER table is a child of the CUSTOMER table, the logical foreign key is CUST_NO, the ITEM table is a child of the ORDER table, and the logical foreign key is ORDER_NO.

In some examples, for products within the ETL and archiving space, the relationship detector 126 can also determine which columns are used for sorting in order to automatically suggest to a customer that those columns become indexes in the target data source. For example, an application 110 listing a customer's orders may use an SQL statement similar to:

SELECT * FROM ORDER
    WHERE CUST_NO=?
    ORDER BY ORDER_DATE

From statements like the above, the relationship detector 126 can infer that using ORDER_DATE on the ORDER table as an index can improve performance. For example, such an index can improve performance in an archive or a data warehouse.

In another example, in order to ensure accurate updates and deletions from a database, tables in database 118 can include an identifier that serves as a primary key. For example, a primary key can be a unique national id like a social security number, or an opaque id like a number, or a universally unique identifier (UUID). The primary key ensures that when a record is updated for a customer with a common name the correct person, and only the correct person, is updated or deleted. For example, the common name may be John Smith and there may be multiple John Smiths in the database 118. To delete a customer, an application 110 may issue an SQL statement similar to:

DELETE FROM CUSTOMER
        WHERE CUST_ID=?

In another example, to update a preferred credit card number for a customer, an application may issue an SQL statement similar to:

UPDATE CUSTOMER
        SET CCN=?
        WHERE CUST_ID=?

By analyzing statements like the above, a relationship detector 126 can infer that CUST_ID is a primary key on the CUSTOMER table.

In another example, the SQL statements may be even more complicated. For example, the SQL statements may contain several table join operations and predicates that span multiple columns. Regardless of the added complexity, the relationship detector 126 can analyze the SQL statements and detect logical relationships. For example, the logical relationships can include logical primary keys, foreign keys, and indexes. In some examples, if all captured SQL statements are stored in the repository 128, the relationship detector 126 can analyze patterns in batches of SQL statements. A batch, as used herein, refers to a plurality of structured query statements that come from the same IP address, within a predetermined time, and against the same tables. This analysis may help in identifying implicit business objects from an observation of common query batches against a series of tables. For example, if the relationship detector 126 repeatedly detects the same three SQL statements against CUSTOMER, ADDRESS, and CREDIT_SCORES from the same application 110 from the same IP addresses within milliseconds of each other, then the relationship detector 126 can treat the SQL statements as a batch.

In some examples, if the returned data for each request indicated by arrow 122 is also saved to the repository 128, the relationship detector 126 can analyze that information to detect relations between tables by analyzing batches of SQL statements. For example, if the relationship detector 126 detects that a query "Select ID from CUSTOMER" returns a value "Ahdgdt2gd5" and soon after the relationship detector 126 detects a query "select * from ORDER where the CID=Ahdgdt2gd5", then the relationship detector 126 can detect a logical relationship between CUSTOMER and ORDER and that CID is a foreign key.

In some examples, the capture module 116 can capture transactions that applications 110 are performing for updating information via network traffic sniffing. By analyzing the SQL statements within those transactions, relationship detector 126 can detect transactional logical relationships between those tables. In some examples, the relationship detector 126 can detect a transactional logical relationship between tables even if there is no explicit transaction in the database. For example, the relationship detector 126 can detect a transactional logical relationship based on a repeated pattern of updates or deletions in close time periods from the same application 110 corresponding to a client device 102 with the same IP address. For example, the same IP address may indicate that the application is operating at the same computing device 102.

In some examples, once the relationship detector 126 has analyzed a sufficiently large number of SQL statements the relationship detector 126 can generate a logical data model that contains the logical relationships, keys and indexes utilized by the application(s) that access the database 118. Such logical data models can be expressed in a number of ways. For example, a logical data model can be expressed as a database definition language (DDL) model, an InfoSphere® Data Architect logical data model, an ERwin® data model, an Extensible Markup Language (XML) model, a JavaScript Object Notation (JSON) model, among other suitable data formats. In some examples, where the logical data model is expressed in a common and/or standard format, other products may utilize the information therein. For example, the logical data model can be shared with other computing devices.

Figure 2:
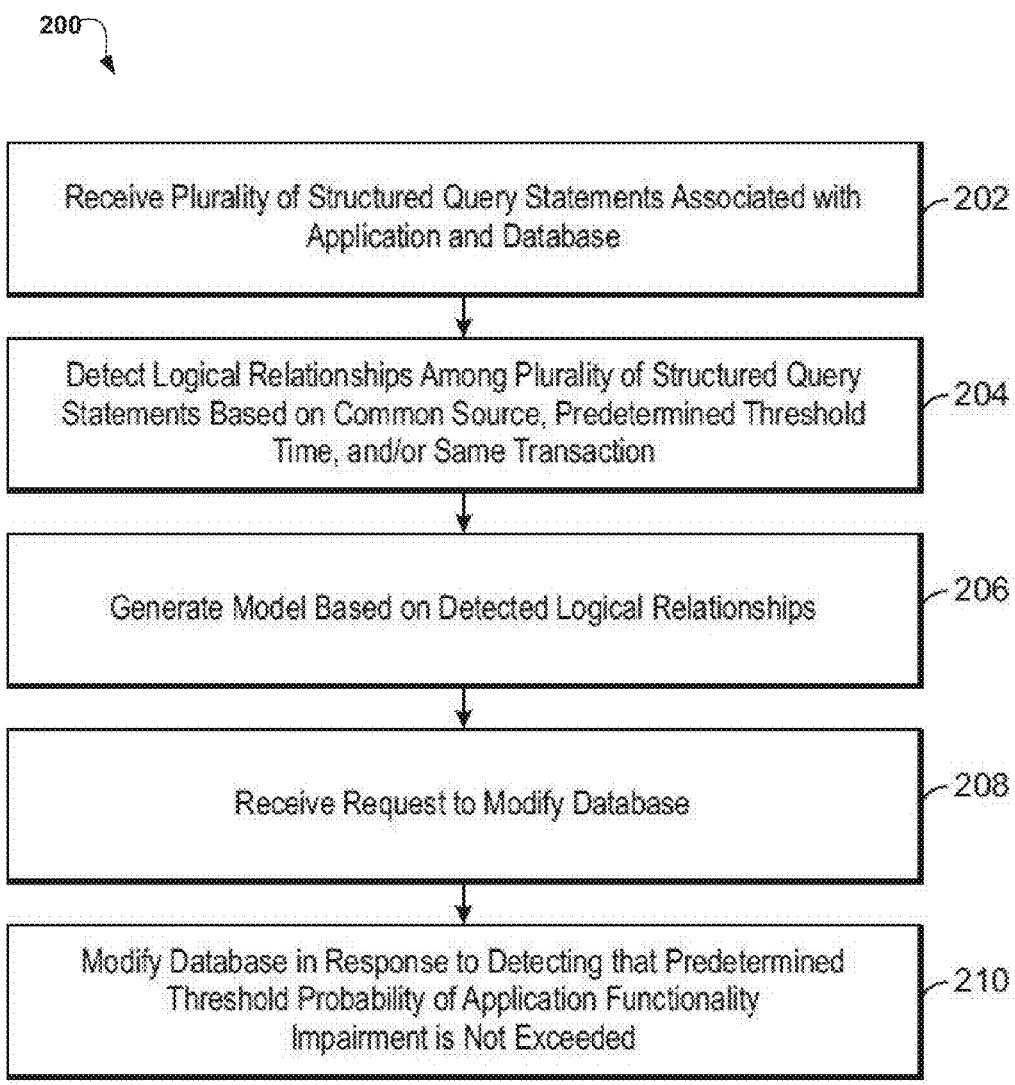
FIG. 2 is a process flow diagram of an example method for detecting logical relationships based on structured query statements.

FIG. 2 is a process flow diagram of an example method for detecting logical relationships based on structured query statements. The method 200 can be implemented using any suitable computing device, such as the processor 502 of the computing device 500 of FIG. 5 below.

At block 202, a processor receives a plurality of structured query statements associated with an application and a database. For example, the structure query statements can be captured via a network proxy between an application and a database server. In some examples, the processor can also receive a plurality of responses to the structured query statements. For example, the plurality of responses may also have been captured via the network proxy. In some examples, the processor can receive a source code of the application and extract the structured query statements from the source code of the application. In some examples, the processor can extract the structured query statements from pre-bound packages stored within a database metadata repository. In some examples, the structured query statements may have been captured via a bespoke database driver.

At block 204, the processor detects logical relationships among a plurality of structured query statements based on a common source, a predetermined threshold time, and/or a same transaction. For example, a common source can be detected via a same IP address. The predetermined threshold time can be a maximum time period in which two or more structured query statements were captured. The same transaction can be a common series of structure query statements and responses. In some examples, the detected logical relationship can be further based on at least one of the plurality of responses to the structured query statements.

At block 206, the processor generates a model based on the detected logical relationships. For example, the model can include a data flow graph. In some examples, the model can be expressed as a database definition language (DDL) model, an InfoSphere® Data Architect logical data model, an ERWin® data model, an XML model, a JSON model, or any other suitable data format.

At block 208, the processor receives a request to modify the database. For example, the modification request can include a request to modify a structure of the database.

At block 210, the processor modifies the database in response to detecting that a predetermined threshold probability of application functionality impairment is not exceeded. For example, the processor can modify the schema of the database, or remove and/or split tables in the database. The predetermined threshold probability of functionality impairment can be a predetermined threshold probability that an application will execute with an error if a modification in the database structure is performed related to a detected logical relationship. For example, the request to modify the database may modify the logical relationship. The processor can assess the probability that the application assumes such logical relationship based on the method that the logical relationship was detected. For example, the processor can calculate a high probability of impairment for a logical relationship based on a single structured query, while calculating a low probability for a rare combination in the same time frame for two entities. For example, the two entities may have a low probability of assuming logical relationships and therefore have a low probability of impairment. In some examples, the processor can generate a report based on the model. For example, the report can include a trust level. The trust level can be based on the detected logical relationships of the database and the relationships assumed by the application generating the report and indicates the strength of the detected logical relationships and an associated probability that any modification to database structures associated with the detected logical relationships may result in impairment of application functionality. In some examples, the trust level can be indicated by color and thus provide a visual indication of the strength of the detected logical relationships. In some examples, the processor can also display a warning in response to receiving a structural change to a database that modifies the detected logical relationship. The warning can indicate that a structural change to the database may cause one or more functionalities of the application to stop working properly. In some examples, the processor can receive a modification confirmation in response to the report and modify the database. In some examples, the processor can detect that one or more functionalities may be affected with a probability exceeding the predetermined threshold probability based on detected logical relationships. The processor can reject the modification request to prevent the functionalities from being impaired. Thus, the present techniques prevent application functionality from being impaired by database modifications.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
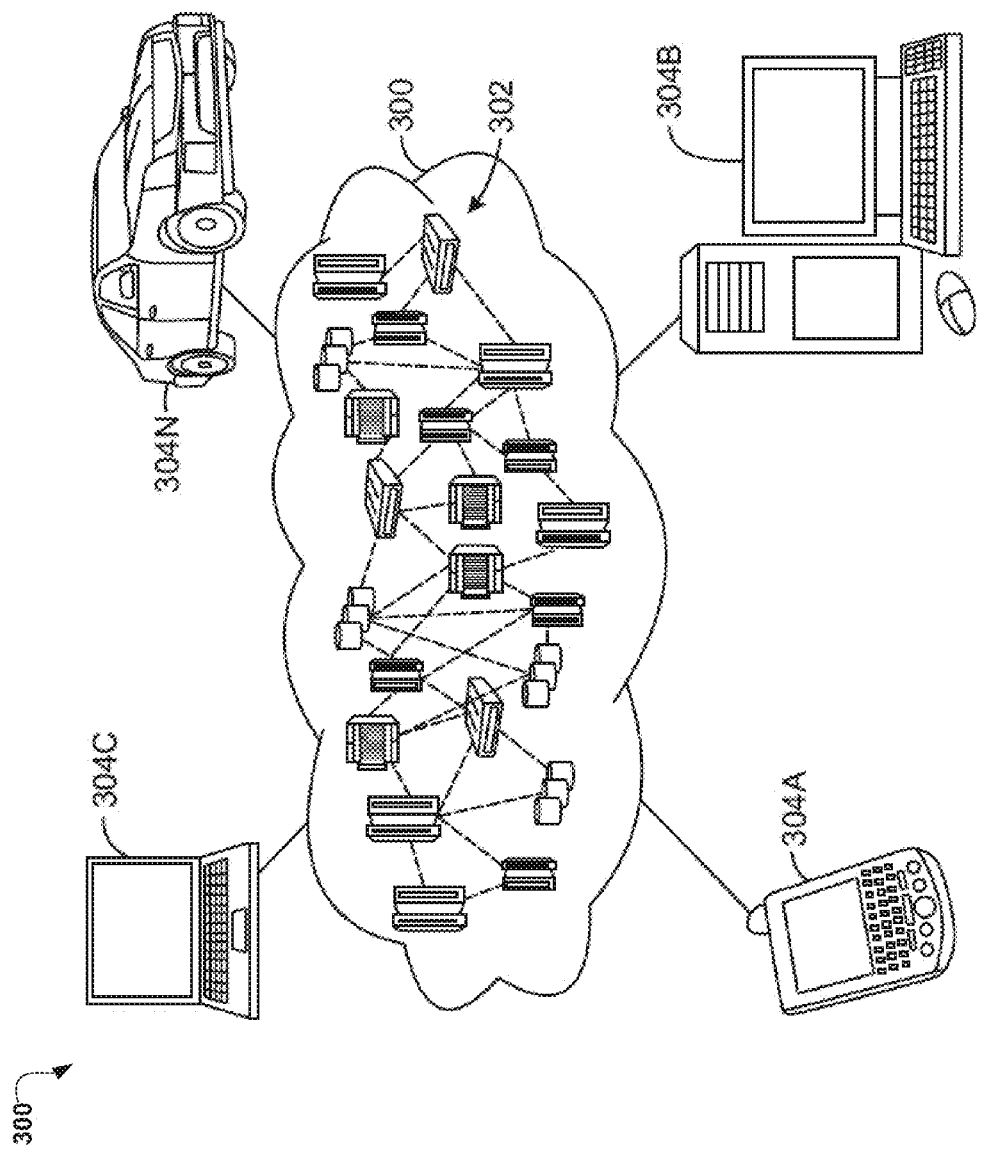
FIG. 3 is a block diagram of an example cloud computing environment according to embodiments described herein.

Referring now to FIG. 3, an illustrative cloud computing environment 300 is depicted. As shown, cloud computing environment 300 comprises one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 304A-N shown in FIG. 3 are intended to be illustrative only and that computing nodes 302 and cloud computing environment 300 can communicate with any type of computerized device over any type of network and/or network addressable connection (e.g., using a web browser).

Figure 4:
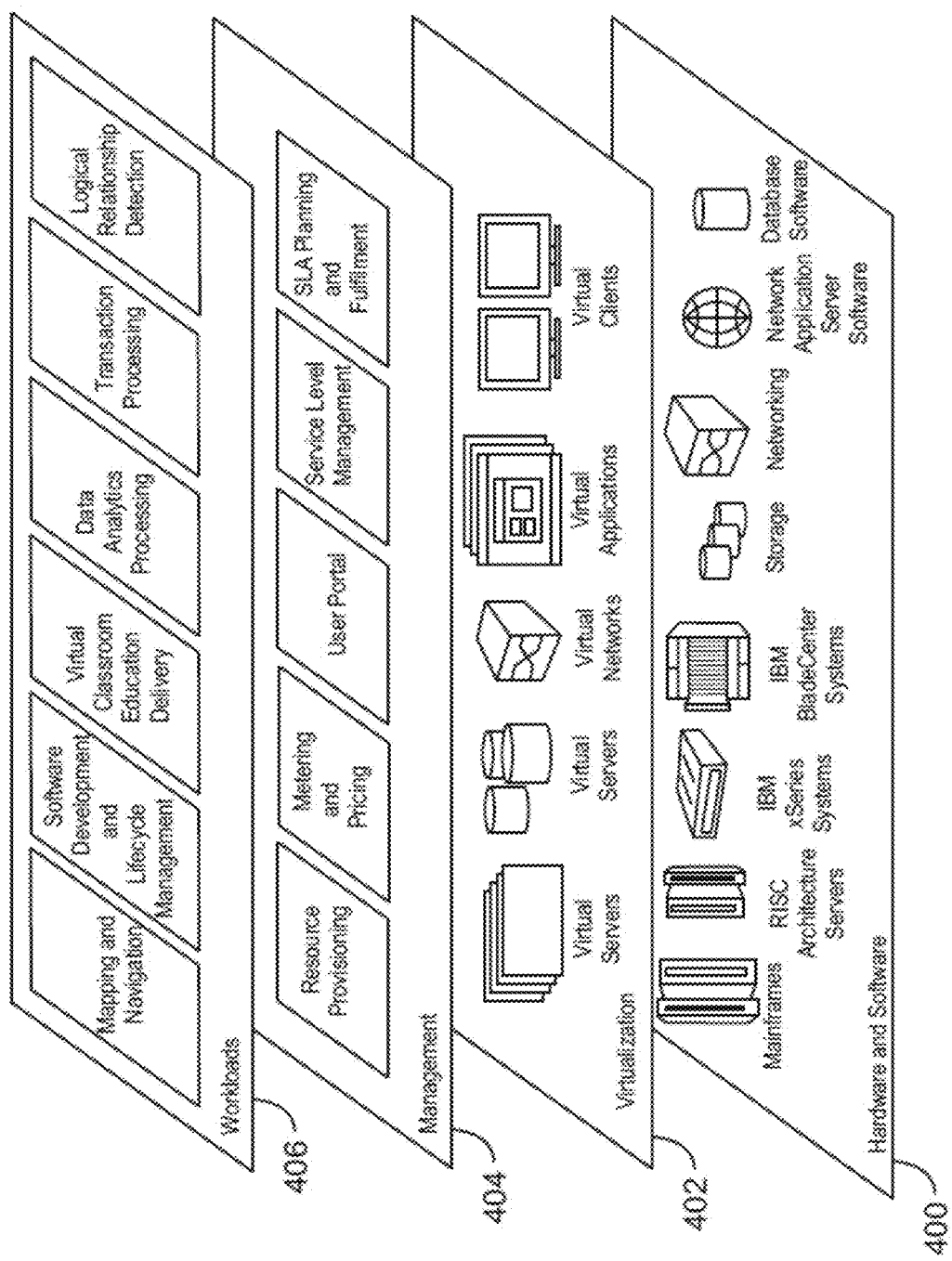
FIG. 4 is an example abstraction model layers according to embodiments described herein.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 402 provides an abstraction layer from which the following examples of virtual entities may be provided: virtual servers; virtual storage; virtual networks, including virtual private networks; virtual applications and operating systems; and virtual clients. In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and logical relationship detection.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
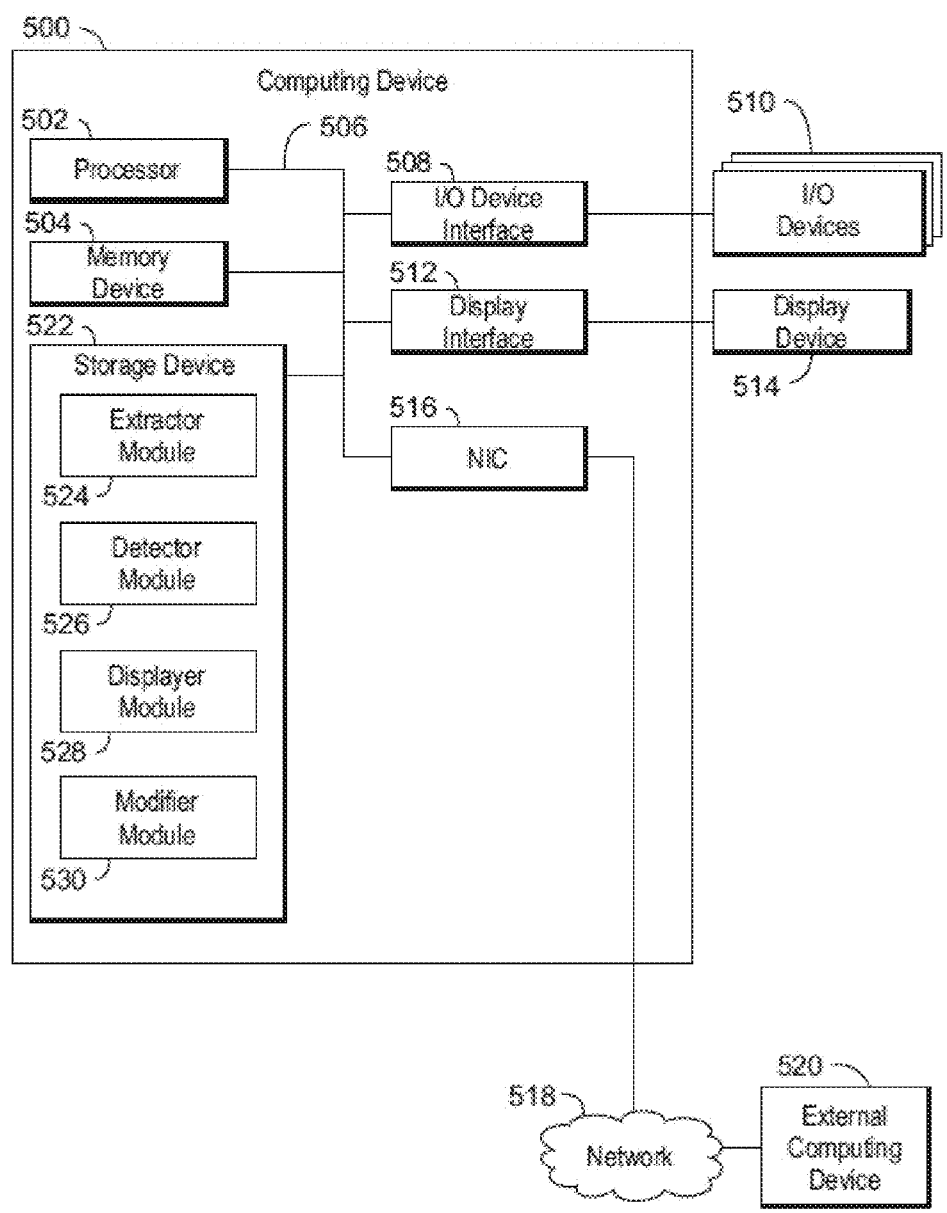
FIG. 5 is a block diagram of an example computing device that can detect logical relationships based on structured query statements.

FIG. 5 is an example computing device can detect logical relationships based on structured query statements. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include an extractor module 524, a detector module 526, a displayer module 528, and a modifier module 530. The extractor module 524 can receive a plurality of structured query statements associated with an application and a database. For example, the structured query statements comprise intercepted SQL statements against a relational database. In some examples, the extractor module 524 can extract structured query statements from a source code of the application. In some examples, the extractor module 524 can capture structured query statements from a bespoke database driver. For example, the bespoke database driver can be an application programming interface (API) for accessing databases such as Open Database Connectivity (ODBC), Java Database Connectivity (JDBC), or a proprietary driver. In some examples, the extractor module 524 can detect structured query statements in real time. The detector module 526 can detect a logical relationship between at least two of the plurality of structured query statements based on a common source, a predetermined threshold time, a common transaction, or any combination thereof. For example, a common source can be detected based on a common Internet Protocol (IP) address. A predetermined threshold time can be a maximum time between detected structured query statements. A common transaction can be associated with two or more of the structured query statements. The detector module 526 can generate a model based on the detected logical relationship. In some examples, the model can include a data flow graph. The displayer module 528 can receive a request to modify the database. The displayer module 528 can display a warning in response to receiving the request to modify the database based on the detected logical relationship. In some examples, the displayer module 528 can generate a report based on the detected logical relationship comprising a trust level indicated by color. The modifier module 530 can also modify the database in response to detecting that a predetermined threshold probability of application functionality impairment is not exceeded. For example, the processor can modify the schema of the database, or remove and/or split tables in the database. For example, the modification may affect an application function with a low probability or not affect any functionality of the application. In some examples, if the modification has a probability of impairing a functionality of the application with a probability that exceeds the predetermined threshold probability, then the modification may be prevented. In some examples, a warning can be issued in response to detecting that the probability of impairing one or more functionalities of the application exceeds the predetermined threshold probability.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the extractor module 524, the detector module 526, the displayer module 528, and the modifier module 530, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the extractor module 524, detector module 526, displayer module 528, and modifier module 530, can be implemented with logic, wherein the logic, as referred to herein, can include any suitable hardware (e.g., a processor, among others), software (e.g., an application, among others), firmware, or any suitable combination of hardware, software, and firmware.

Figure 6:
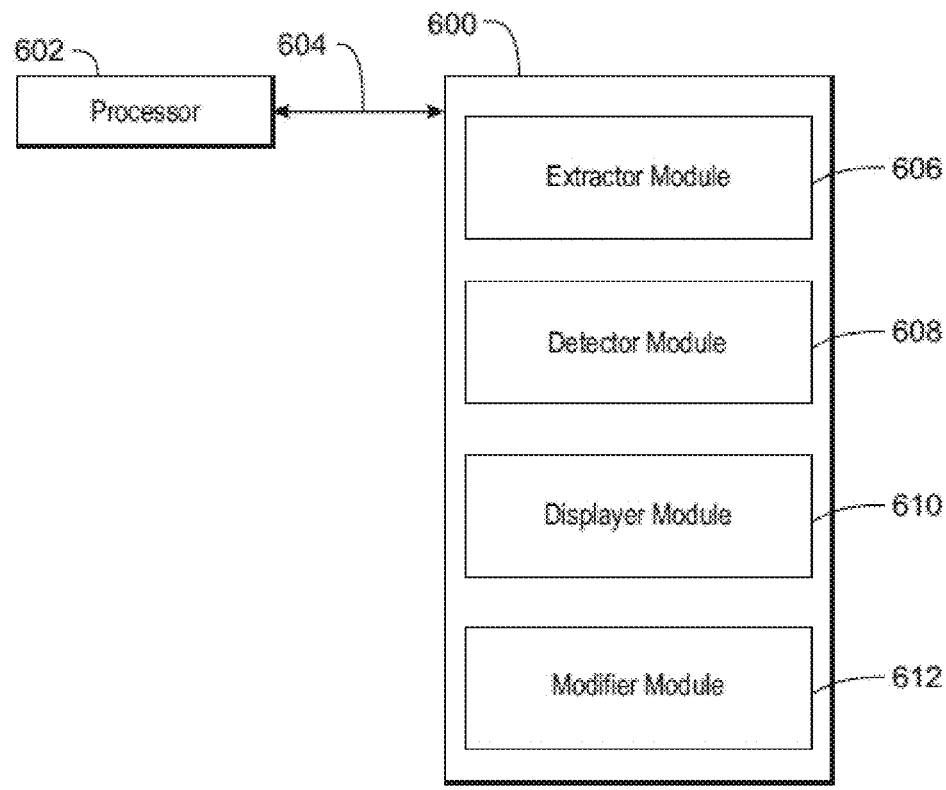
FIG. 6 is an example tangible, non-transitory computer-readable medium that can detect logical relationships based on structured query statements.

Referring now to FIG. 6, a block diagram is depicted of an example tangible, non-transitory computer-readable medium 600 that can detect logical relationships based on structured query statements. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, an extractor module 606 includes code to receive a plurality of structured query statements associated with an application and a database. The extractor module 606 can also include code to extract the plurality of structured query statements from the source code of the application. The extractor module 606 can also further include code to extract the plurality of structured query statements from pre-bound packages stored within a database comprising a metadata repository. The extractor module 606 can also include code to capture the plurality of structured query statements from a bespoke database driver. A detector module 608 includes code to detect a logical relationship between at least two of the plurality of structured query statements based on a common source of the at least two structured query statements, a predetermined threshold time between the at least two structured query statements, a common transaction associated with the at least two structured query statements, or any combination thereof. In some examples, the detector module 608 can include code to detect a batch of statements in the plurality of structured query statements. For example, a batch of statements can be detected based on a predetermined threshold time, a common source, and/or same transaction. In some examples, the detector module 608 can include code to generate a model based on the detected logical relationship. For example, the model can include a data flow graph. In some examples, the model can be expressed as a Database definition language (DDL) model, an InfoSphere® Data Architect logical data model, an ERWin® data model, an XML model, a JSON model, or any other suitable data format. A displayer module 610 includes code to receive a request to modify the database and generate a report based on the model. The displayer module 610 can also include code to display a warning in response to receiving the request to modify the database based on the detected logical relationship. A modifier module 612 can modify the database in response to detecting that a predetermined threshold probability of application functionality impairment is not exceeded. For example, the modifier module 612 can modify the schema of the database, or remove and/or split tables in the database. In some examples, the detector module 608 can calculate the probability based on the model. In some examples, if the predetermined threshold probability is exceed, then the modifier module 612 can prevent the modification of the database. For example, the modifier module 612 can cause the displayer module 610 to display the warning instead. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for detecting logical relationships between structured query statements, the computer program product comprising a computer-readable storage medium having program code embodied therewith, wherein the computer readable storage medium is not a transitory signal per se, the program code executable by a processor to cause the processor to:

receive a plurality of structured query statements associated with an application and a database by extracting the plurality of structured query statements from a source code of the application, extracting the plurality of structured query statements from pre-bound packages stored on the database comprising a metadata repository, and capturing the plurality of structured query statements from a bespoke database driver wherein the plurality of structured query statements comprise a plurality of intercepted SQL statements against a relational database;

detect a logical relationship between at least two of the plurality of structured query statements based on a common source of the at least two of the plurality of structured query statements, a predetermined threshold time between the at least two of the plurality of structured query statements, and a common transaction associated with the at least two of the plurality of structured query statements;

generate a model based on the detected logical relationship;

receive a request to modify the database, wherein a warning is displayed in response to receiving the request to modify the database based on the detected logical relationship;

calculate a probability of application functionality impairment associated with the request to modify the database based on the logical relationship, wherein the request to modify the database is to modify the logical relationship; and modify the database in response to detecting that the probability of application functionality impairment is not exceeded.

\* \* \* \* \*